United States Patent
Renault et al.

(10) Patent No.: US 12,095,068 B2
(45) Date of Patent: Sep. 17, 2024

(54) RECHARGEABLE NON-AQUEOUS LITHIUM-AIR BATTERY CELL COMPRISING A SOLID ORGANIC CATALYST

(71) Applicants: TOYOTA MOTOR EUROPE, Brussels (BE); CENTRE NATIONAL DE LA RECHERCHE SCIENTIFIQUE, Paris (FR); UNIVERSITE DE NANTES, Nantes (FR); Steven Renault, Uppsala (SE); Marco Carboni, Uppsala (SE)

(72) Inventors: Steven Renault, Uppsala (SE); Marco Carboni, Uppsala (SE); Fanny Jeanne Julie Barde, Leuven (BE); Philippe Poizot, Nantes (FR)

(73) Assignees: TOYOTA MOTOR EUROPE, Brussels (BE); CENTRE NATIONAL DE LA RECHERCHE SCIENTIFIQUE, Paris (FR); UNIVERSITE DE NANTES, Nantes (FR)

(*) Notice: Subject to any disclaimer, the term of this patent is extended or adjusted under 35 U.S.C. 154(b) by 106 days.

(21) Appl. No.: 17/794,129

(22) PCT Filed: Jan. 20, 2020

(86) PCT No.: PCT/IB2020/000086
§ 371 (c)(1),
(2) Date: Jul. 20, 2022

(87) PCT Pub. No.: WO2021/148835
PCT Pub. Date: Jul. 29, 2021

(65) Prior Publication Data
US 2023/0074459 A1   Mar. 9, 2023

(51) Int. Cl.
*H01M 12/08* (2006.01)
*H01M 4/86* (2006.01)
(Continued)

(52) U.S. Cl.
CPC ......... *H01M 12/08* (2013.01); *H01M 4/8652* (2013.01); *H01M 4/8668* (2013.01);
(Continued)

(58) Field of Classification Search
CPC .... H01M 12/02; H01M 12/08; H01M 4/8652; H01M 4/8668; H01M 4/9008; H01M 4/96
See application file for complete search history.

(56) References Cited

U.S. PATENT DOCUMENTS 7,282,295 B2   10/2007   Visco et al.
7,491,458 B2   2/2009    Visco et al.
(Continued)

FOREIGN PATENT DOCUMENTS

EP   1 096 591 A1   5/2001

OTHER PUBLICATIONS

Liu et al., "An Organic Catalyst for Li—O2 Batteries: Dilithium Quinone-1,4-Dicarboxylate", ChemSusChem; 2015; pp. 2198-2203; vol. 8. (Year: 2015).*
(Continued)

*Primary Examiner* — Karie O'Neill Apicella
(74) *Attorney, Agent, or Firm* — Oliff PLC

(57) ABSTRACT

A lithium-air battery cell wherein the positive electrode includes a solid p-type electroactive organic catalyst lithium salt and a battery pack including several lithium-air battery cells. The use of a battery pack as a rechargeable battery for vehicles, such as electric vehicles and hybrid vehicles, electronic devices, and stationary power generating devices.

(Continued)

Finally, a vehicle, an electronic device, and a stationary power generating device, including a battery pack.

20 Claims, 5 Drawing Sheets

(51) Int. Cl.
    *H01M 4/90*         (2006.01)
    *H01M 4/96*         (2006.01)
    *H01M 12/02*       (2006.01)

(52) U.S. Cl.
    CPC ........... *H01M 4/9008* (2013.01); *H01M 4/96* (2013.01); *H01M 12/02* (2013.01); *H01M 2004/8689* (2013.01); *H01M 2220/10* (2013.01); *H01M 2220/20* (2013.01); *H01M 2220/30* (2013.01)

(56) References Cited

U.S. PATENT DOCUMENTS

| | | |
|---|---|---|
| 8,652,692 B2 | 2/2014 | Visco et al. |
| 2005/0100792 A1 | 5/2005 | Visco et al. |
| 2005/0175894 A1 | 8/2005 | Visco et al. |
| 2007/0117007 A1 | 5/2007 | Visco et al. |
| 2010/0266907 A1 | 10/2010 | Yazami |

OTHER PUBLICATIONS

Liu et al.; "An Organic Catalyst for Li—O2 Batteries: Dilithium Quinone-1,4-Dicarboxylate;" ChemSusChem; 2015; pp. 2198-2203; vol. 8.

Selvaraj et al.; "Dilithium phthalocyanine as a catalyst for oxygen reduction in non-aqueous Li—O2 cells;" Journal of Porphyrins and Phthalocyanines; 2012; pp. 255-259; vol. 16.

Renault et al.; "A green Li-organic battery working as a fuel cell in a case of emergency;" Energy Environ. Sci.; 2013; pp. 2124-2133; vol. 6.

Kundu et al.; "A Highly Active Low Voltage Redox Mediator for Enhanced Rechargeability of Lithium-Oxygen Batteries;" ACS Central Science; 2015; pp. 510-515; vol. 1.

Deunf et al.; Reversible anion intercalation in a layered aromatic amine: a high-voltage host structure for organic batteries; Journal of Material Chemistry A; 2016; pp. 6131-6139; vol. 4.

Lee et al.; "An Advanced Separator for L—O2 Batteries: Maximizing the Effect of Redox Mediators;" Advanced Energy Materials; 2017; pp. 1-6; vol. 1602417.

Qiao et al.; "MOF-Based Separator in an Li—O2 Battery: An Effective Strategy to Restrain the Shuttling of Dual Redox Mediators;" ACS Energy Letters; 2018; pp. 463-468; vol. 3.

Gao et al.; "Promoting solution phase discharge in L—O2 batteries containing weakly solvating electrolyte solutions; Nature Materials; 2016; pp. 882-889; vol. 15.

Gao et al.; "A rechargeable lithium-oxygen battery with dual mediators stabilizing the carbon cathode;" Nature Energy; 2017; pp. 1-7; vol. 2, No. 17118.

Chen et al.; "Charging a Li—O2 battery using a redox mediator;" Nature Chemistry; 2013; pp. 1-6.

Hase et al.; "A highly efficient Li2O2 oxidation system in Li—O2 batteries;" Chem Commun; 2016; pp. 12151-12154; vol. 52.

Bergner et al.; "Understanding the fundamentals of redox mediators in Li—O2 batteries: a case study on nitroxides;" Phys. Chem. Chem. Phys.; 2015; pp. 31769-31779; vol. 17.

Croce et al.; "Role of the ceramic fillers in enhancing the transport properties of composite polymer electrolytes;" Electrochimica Acta; 2001; pp. 2457-2461; vol. 46.

Kamaya et al.; "A lithium superionic conductor;" Nature Materials; 2011; pp. 1-5.

Song et al.; "Review of gel-type polymer electrolytes for lithium-ion batteries;" Journal of Power Sources; 1999; pp. 183-197; vol. 77.

Świerczyński et al.; "Composite Polymeric Electrolytes from the PEODME-LiClO4—SiO2 System;" Chem. Mater; 2001; pp. 1560-1564; vol. 13.

Oct. 15, 2020 Search Report issued in International Patent Application No. PCT/IB2020/000086.

Oct. 15, 2020 Written Opinion of the International Searching Authority issued in International Patent Application No. PCT/IB2020/000086.

Sep. 26, 2023 Office Action issued in Japanese Patent Application No. 2022-544168.

\* cited by examiner

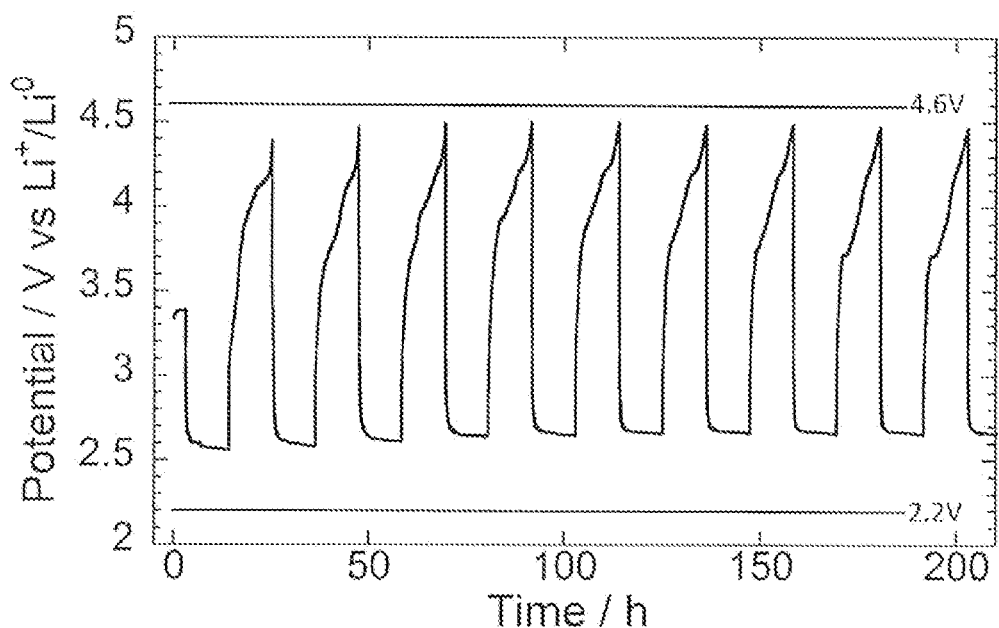
Fig. 2a
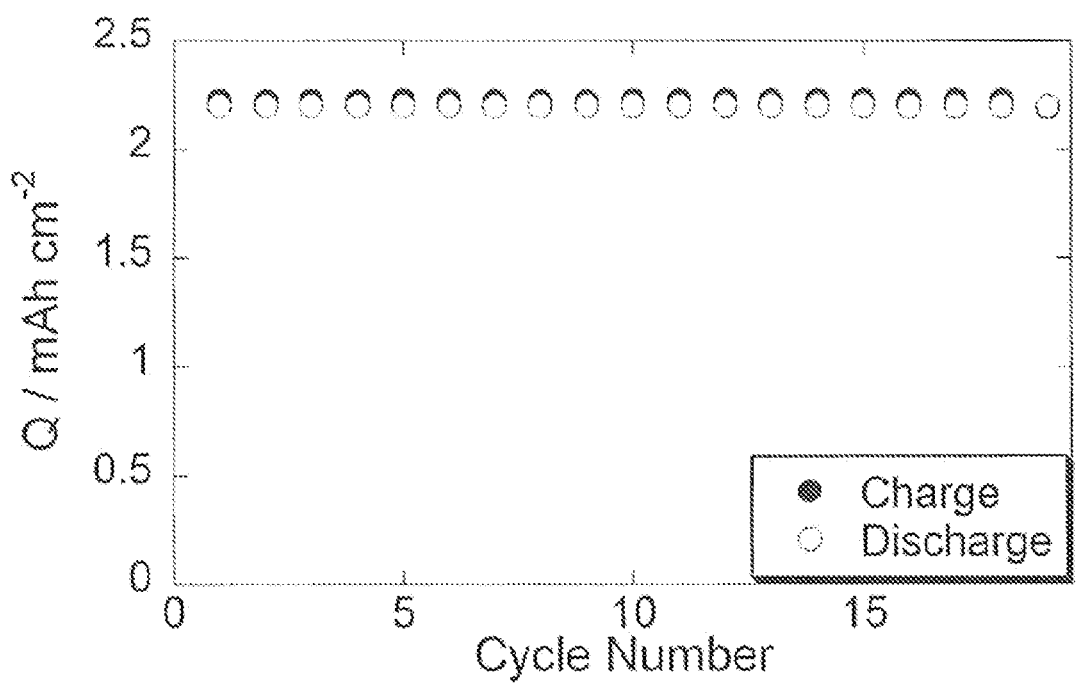
Fig. 2b
Figure 2

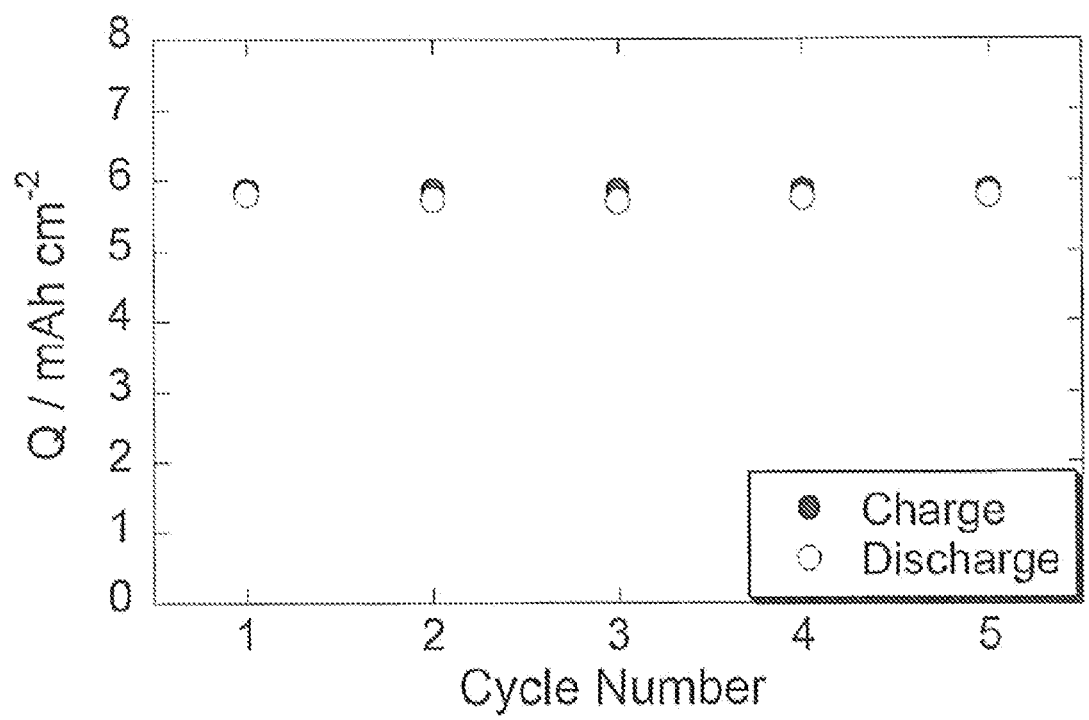
Fig. 3a
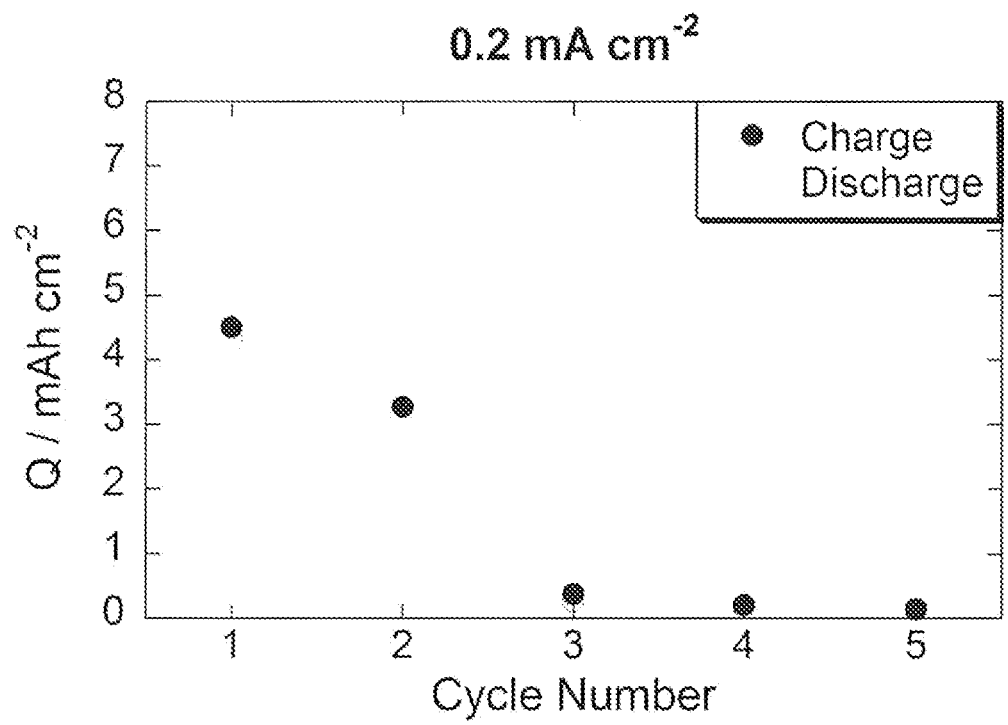
Fig. 3b
Figure 3

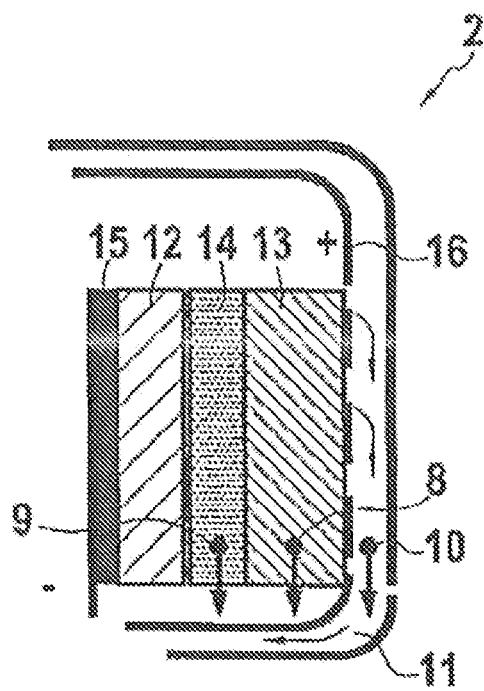
Fig. 5a
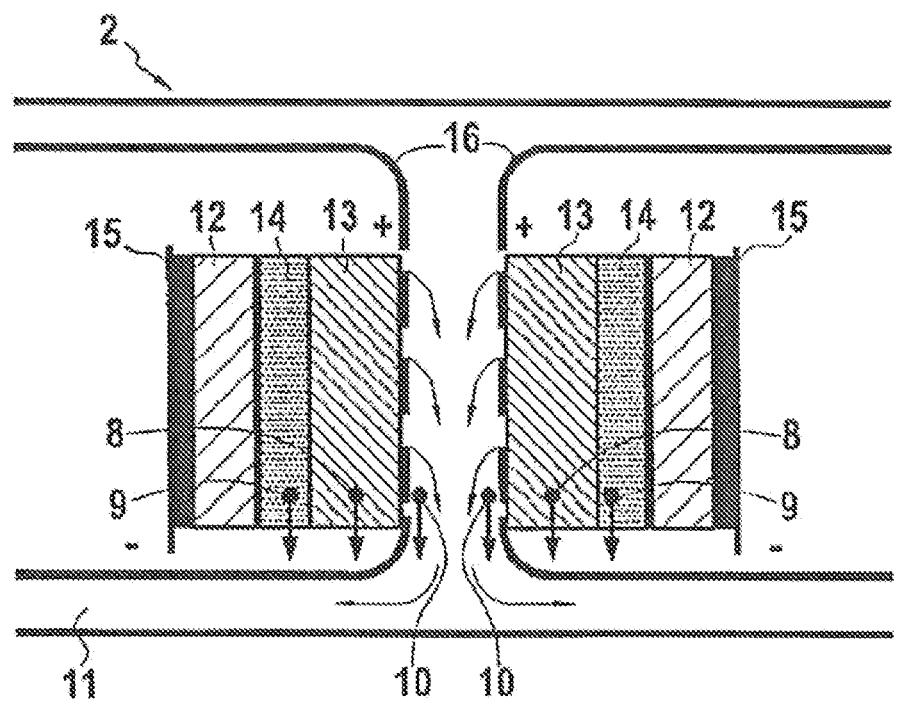
Fig. 5b
Figure 5

RECHARGEABLE NON-AQUEOUS LITHIUM-AIR BATTERY CELL COMPRISING A SOLID ORGANIC CATALYST

FIELD OF THE INVENTION

The present invention relates to a lithium-air battery cell comprising a solid p-type electroactive organic catalyst lithium salt in the positive electrode. The invention also concerns a battery pack comprising several lithium-air battery cells according to the invention. The use of a lithium-air battery pack according to the invention as a rechargeable battery for vehicles, such as electric vehicles and hybrid vehicles, electronic devices, and stationary power generating devices, is also part of the invention. Finally, the invention concerns a vehicle, an electronic device, and a stationary power generating device, comprising a battery pack according to the invention.

Technological Background

Rechargeable lithium batteries are of considerable interest due to their high energy density and high power. Especially, rechargeable lithium-air batteries have attracted attention for electric vehicles and hybrid vehicles, where high energy density is required. Lithium-air battery cells are used in various devices (such as computers and telephones), in automotive or stationary applications, and can be assembled in battery packs.

Rechargeable lithium-air batteries use oxygen in the air as a cathode active material. Therefore, compared to conventional lithium rechargeable batteries containing a transition metal oxide (e.g. lithium cobaltate), as a cathode active material, rechargeable lithium-air batteries are able to have larger capacity.

In metal-air batteries, the cathode active material, oxygen, is not contained within the battery. Instead, this material is provided by the surrounding atmosphere. Naturally, such a system allows in principle a very high specific energy (energy provided by the battery per unit weight, typically given in Wh/kg in this technical field). In such batteries, oxygen may be partially reduced to peroxide, or fully reduced to hydroxide or oxide depending on the catalyst, electrolyte, availability of oxygen, etc. When the negative electrode (anode) is lithium (Li), lithium peroxide ($Li_2O_2$) or lithium oxide ($Li_2O$) may be formed.

A lithium-air battery cell comprises in general the following parts:
  metal anode (e.g. containing Li),
  non-aqueous electrolyte (e.g. containing a lithium salt), and
  air cathode.

Other parts of the battery cell device may be present such as: current collectors on the anode and/or cathode side; a separator between the cathode-side electrolyte (catholyte) and anode-side electrolyte (anolyte); a barrier layer between a positive electrode (cathode) and electrolyte, or between a negative electrode (anode) and electrolyte.

Issues to be addressed in developing lithium-air battery cells include:
  avoiding the migration to the anode of soluble catalysts used at the positive electrode (cathode);
  lowering hysteresis by decreasing charging voltage and/or increasing discharge voltage of the lithium-air battery by avoiding degradation of electrolyte;
  increasing capacity of the lithium-air battery at a fixed rate.

To avoid migration of soluble catalysts at the anode, special separators may be used. Lee at al. (Adv. Energy Mater., 2017, 1602417) propose the use of glass fiber separators (GF/C, Whatman) coated with a polymer mixture of PEDOT:PSS [poly(3,4-ethylenedioxythiophene) polystyrene sulfonate] to avoid the migration of the soluble catalyst DMPZ (5,10-dihydro-5,10-dimethylphenazine) used for Oxygen Evolution Reaction (OER). Qiao et al. (ACS Energy Lett. 2018, 3, 463-468) suggest avoiding the shuttling of soluble catalysts to the Li anode by using a special metal-organic framework (MOF)-based separator blocking the soluble species.

Gao et al. propose 2,5-Di-tert-Butyl-1,4-BenzoQuinone (DBBQ) as a soluble catalyst to increase the rate performances of a non-aqueous lithium-air battery cell. The air electrode is a Gas Diffusion Layer (GDL) based porous carbon electrode as air cathode. The anode is $LiFePO_4$ (Nature Materials, 2016, 15, 882) or Li protected by a Ohara glass necessitating the use of a two-compartment cell (Nature Energy, Vol. 2, 17118 (2017)), but Li metal cannot be used as anode because DBBQ would migrate to it and causes problem at the anode.

Chen et al., Nature Chemistry, 2013, 5, 489, report TetraThiaFulvalene (TTF) as a soluble catalyst and nano-porous gold as air cathode. Partially charged $LiFePO_4$ is used as anode.

Kundu et al., ACS Cent., Sci., 2015, 1, 510-515, use tris[4-(diethylamino)phenyl]amine (TDPA) as a soluble catalyst to promote the oxidation of $LiO_2$ (charge process).

The major drawback of the solutions proposed by the prior art is the use of a soluble catalyst which does not permit the use of Li metal (without extra protection) as anode. Indeed, the migration of soluble catalysts at the anode deteriorates the lithium-air battery performances and safety, needing the use of additional features such as:
  a protection barrier to protect the Li metal from soluble catalysts contamination which can deposit at the surface of the Li metal and create nucleation site causing the formation of dendrites,
  special separators blocking the solute species, or
  specific cell design such as a two-compartment cell composed of two electrolyte compartments, i.e. one for the anode side and the other for the cathode side, to protect the Li anode.

Hase et al., Chem. Commun. 2016, 52, 12151-12154, also use methoxy-2,2,6,6-tetramethylpiperidine-1-oxyl (MeO-TEMPO) as soluble catalyst to enable the oxidation of $Li_2O_2$ without parasitic reactions attributed to electrochemical charging. However, the TEMPO molecule needs to be chemically regenerated outside of the battery cell at the end of charge, which is not practical at all since the battery cell has to be refilled with new electrolyte after each charge.

Bergner et al., Phys. Chem. Chem. Phys., 2015, 17, 31769-31779, relate the use of nitroxides catalysts such as 1-methyl-2-azaadamantane-N-oxyl (1-Me-AZADO). However, these nitroxides have the disadvantage of being soluble in the electrolyte, thus deteriorating the anode of lithium-air battery cells.

The present invention remedies to all the problems of the prior art by providing a lithium-air battery cell comprising a Solid Organic Catalyst (SOC) in the positive electrode, which:
  increases the capacity of $Li—O_2$ battery cell at a fixed rate, increases re-chargeability of Li—$O_2$ battery cell, and therefore the cyclability of the battery cell, increases rate performances, which means the speed of (dis)charge of the battery cell, while retaining a decent capacity, allows a simpler battery cell design since the SOC of the invention is not soluble, and therefore does not need a lithium protective layer, a special separator, or a two-compartment cell, the SOC is self-regenerated Inside the battery cell and returns to its initial state, allows to decrease the amount of carbon used at the positive electrode (air cathode), and therefore avoid corrosion of carbon which is known as a source of poor re-chargeability. Indeed, carbon is well-known in lithium-air battery systems to corrode and lead to partial formation of $Li_2CO_3$ (side reaction discharge product) instead of $LiO_2$ (ideal discharge product).

In addition, the SOC of the invention is cost effective (compared to other catalysts used in lithium-air systems based on gold, platinum or cobalt oxides) and is an environmentally-friendly organic material that may be prepared from renewable resources (biomass).

SUMMARY OF THE INVENTION

The present invention, in one aspect, relates to a lithium-air battery cell comprising:

a negative electrode (anode) containing a negative-electrode active material;

a positive electrode (cathode) using oxygen as a positive-electrode active material; and a non-aqueous electrolyte medium arranged between the negative electrode and the positive electrode;

wherein the positive electrode comprises a solid p-type electroactive organic catalyst lithium salt.

In another aspect, the invention relates to a battery pack comprising several lithium-air battery cells according to the invention assembled together.

The invention also relates to the use of a battery pack according to the invention as a rechargeable battery for electric vehicles and hybrid vehicles, electronic devices, and stationary power generating devices.

Finally, the invention also relates to a vehicle, an electronic device, and a stationary power generating device, comprising a battery pack according to the invention.

BRIEF DESCRIPTION OF THE FIGURES

FIG. 2 shows the cycling of the lithium-air battery cell (FIG. 2a) and the capacity retention versus cycle number of the lithium-air battery cell (FIG. 2b) of Example 1 ($Li_2DAnT$:Carbon Super C65 (2:7)) at 0.2 mAh·$cm^{-2}$ rate, within the potential window 2.2-4.6 V versus $Li^+/Li$ and with a capacity limitation of 800 mAh·$g^{-1}$soc (~2.15 mAh·$cm^{-2}$).

FIG. 3 shows the cycling of the lithium-air battery cell (FIG. 3a) of Example 1 at 0.2 mAh·$cm^{-2}$ rate, within the potential window 2.2-4.6 V versus $Li^+/Li$ and with a capacity limitation of 2000 mAh·$g^{-1}$soc (~6 mAh·$cm^{-2}$), and of Comparative Example 1 (FIG. 3b).

FIG. 5 is a schematic view of a metal-air battery cell with one electrochemical cell inside a gas compartment (FIG. 5a) and a metal-air battery pack with several cells inside a gas compartment (FIG. 5b), with: 11: gas compartment (dry air or pure oxygen), 12: metal anode, 13: cathode, 14: electrolyte/separator, 15: anode current collector, and 16: cathode current collector.

DETAILED DESCRIPTION OF THE INVENTION

Figure 1:
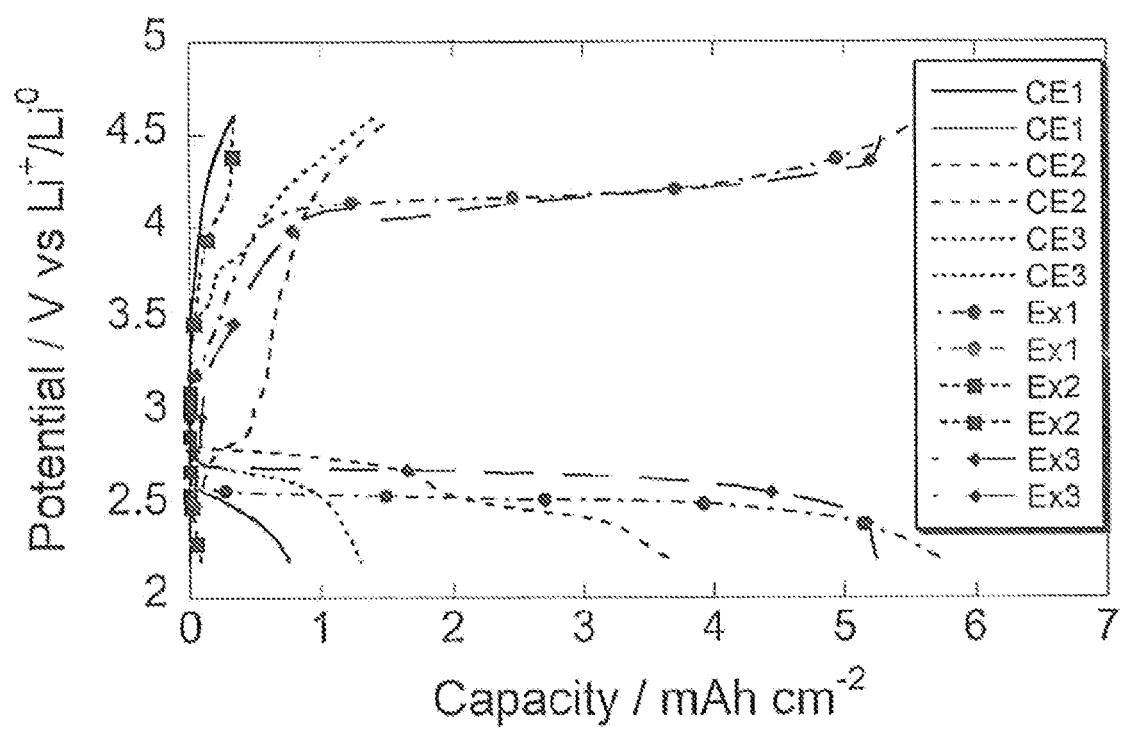
FIG. 1 shows the voltage (V versus $Li^+/Li$) versus the capacity (mAh·$cm^{-2}$) for a lithium-air battery cell cycled at 0.2 mAh·$cm^{-2}$ as described in Examples 1, 2 and 3 (Ex1, Ex2, Ex3) compared to Comparative Examples 1, 2 and 3 (CE1, CE2, CE3).

The present invention relates to a lithium-air cell comprising:

a negative electrode (anode) containing a negative-electrode active material;

a positive electrode (cathode) using oxygen as a positive-electrode active material; and a non-aqueous electrolyte medium arranged between the negative electrode and the positive electrode;

wherein the positive electrode comprises a solid p-type electroactive organic catalyst lithium salt.

The Solid Organic Catalyst (SOC) of the invention has the main advantage of not being soluble in electrolyte, avoiding the migration of soluble species to the anode. It further enhances the electrochemical performances of the reactions involving oxygen such as Oxygen Evolution Reaction (OER) and Oxygen Reduction Reaction (ORR), thus improving the capacity and re-chargeability of non-aqueous lithium-air battery cells.

<Anode>

In the lithium-air battery cell of the present invention, the negative electrode (which may also be referred to as "anode" hereinafter) comprises at least an anode active material (which may also be referred to as "negative electrode active material" hereinafter). As the anode active material, general anode active materials for lithium batteries can be used and the anode active material Is not particularly limited. In general, the anode active material is able to store/release a lithium ion ($Li^+$).

Specific anode active materials for rechargeable lithium-air batteries are, for example, a lithium metal, lithium protected anodes, lithium alloys such as a lithium-aluminum alloy, a lithium-tin alloy, a lithium-lead alloy and a lithium-silicon alloy, metal oxides such as a lithium-titanium oxide, metal nitrides such as a lithium-cobalt nitride, a lithium-iron nitride and a lithium manganese nitride. Of these, lithium metal is preferred.

By "lithium-protected anode", reference Is made here for example (but is not limited to) to a "Lithium Protected Electrode" (LPE) as described in U.S. Pat. No. 8,652,692. Usually the Li metal is covered by a solid electrolyte (for example LiSiCON (lithium superionic conductor) with formulae $LiM_2(PO_4)_3$). Between the LiSiCON and the Li metal, there is usually an interlayer (for example consisting of $Cu_3N/Li_3N$). In LPE systems, Li metal can be attached directly to one side of LiSiCON material, or alternatively a small amount of solvent containing a Li salt electrolyte may be added between the LiSiCON material and the Li metal to ensure Li ionic conductivity. Such materials have been described in, for example, U.S. Pat. Nos. 7,282,295 and 7,491,458. LiSiCON materials have also been described in Nature Materials, 10, 682-686 (2011).

When a metal, alloy or the like in the form of foil or metal is used as the anode active material, it can be used as the anode itself.

The anode is required to contain at least an anode active material; however, as needed, it can contain a binder for fixing the anode active material. The type and usage of the binder are the same as those of the air cathode described hereinafter.

An anode collector may be connected to the anode, which collects current from the anode. The material for the anode collector and the shape of the same are not particularly limited. Examples of the material for the anode collector include stainless steel, copper and nickel. Examples of the form of the anode collector include a foil form, a plate form and a mesh (grid) form.

<Cathode>

In the lithium-air battery cell of the present invention, the positive electrode (which may also be referred to as "cathode" hereinafter) comprises at least a cathode active material (which may also be referred to as "positive electrode active material" hereinafter).

In the lithium-air battery cell of the present invention, the positive electrode uses oxygen as a positive-electrode active material. Oxygen serving as the positive-electrode active material may be contained in air or oxygen gas.

<Catalyst>

In the lithium-air battery cell of the present invention, the catalyst present in the positive electrode is a solid p-type electroactive organic catalyst lithium salt.

In a preferred embodiment, the solid p-type electroactive organic catalyst lithium salt has the following general structure (1):

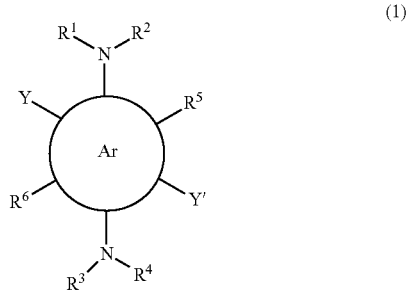

wherein:
  Ar is an aromatic or heteroaromatic ring selected from the group consisting of: benzene, naphthalene, perylene, anthracene, phenanthrene, tetracene, chrysene, triphenylene, pyrene, pentacene, benzo[a]pyrene, corannulene, benzo[ghi]perylene, coronene, ovalene, benzo[c]fluorine, pyridine, quinolone, isoquinoline, pyrazine, quinoxaline, acridine, pyrimidine, quinazoline, pyridazine, cinnoline, phthalazine, 1,2,3-triazine, 1,2,4-triazine, 1,3,5-triazine,
  $R^1$ to $R^4$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O═)CHNR, —HN(O═)CR, —(O═)COR, —HN(O═)CHNR, —HN(O═)COR, —(HN═)CHNR, —HN(HN═)CHNR, —(S═)CHNR, —HN(S═)CHNR, with R being H or a $C_1$-$C_{19}$-alkyl group, and preferably with R being H or a $C_1$-$C_6$-alkyl group, said $R^1$ to $R^4$ groups comprising from 1 to 20 carbon atoms and being optionally substituted with at least one halogen, oxygen or sulphur atom,
  $R^5$ and $R^6$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O═)CHNR, —HN(O═)CR, —(O═)COR, —HN(O═)CHNR, —HN(O═)COR, —(HN═)CHNR, —HN(HN═)CHNR, —(S═)CHNR, —HN(S═)CHNR, with R being H or a $C_1$-$C_{19}$-alkyl group, and preferably with R being H or a $C_1$-$C_6$-alkyl group, said $R^5$ and $R^6$ groups comprising from 1 to 20 carbon atoms and being optionally substituted with at least one halogen, oxygen or sulphur atom,
  Y and Y' are anionic groups each independently selected from the group consisting of carboxylate, thiocarboxylate, sulfonate, thiosulfonate, phosphonate, thiophosphonate, sulfate, amidate groups.

In the sense of the invention, the following terms mean:
Alkyl: a saturated, linear or branched, $C_1$-$C_{20}$, preferably $C_1$-$C_{12}$, more preferably $C_1$-$C_6$, and even more preferably $C_1$-$C_4$, hydrocarbon-based aliphatic group. The term "branched" means that at least one lower alkyl group such as methyl or ethyl is carried by a linear alkyl chain. As the alkyl group, there may be mentioned, for example, methyl, ethyl, n-propyl, i-propyl, n-butyl, t-butyl, i-butyl, s-butyl and n-pentyl;

Aryl: any functional group or substituent derived from at least one aromatic ring; an aromatic ring corresponds to any planar mono- or polycyclic group comprising a delocalized n-system in which each atom of the cycle comprises a p-orbital, said p-orbital overlapping each other; among such aryl groups there may be mentioned phenyl, biphenyl, naphthalene and anthracene groups. The aryl groups of the invention preferably comprise from 4 to 20 carbon atoms, even preferably from 4 to 12 carbon atoms, and even more preferably from 5 to 6 carbon atoms;

Alkenyl: a linear or branched, $C_1$-$C_{20}$, preferably $C_1$-$C_{12}$, more preferably $C_1$-$C_6$, and even more preferably $C_1$-$C_4$, unsaturated hydrocarbon-based aliphatic group that contains at least one carbon-carbon double bond. The term "branched" means that at least one lower alkyl group such as methyl or ethyl is carried by a linear alkenyl chain;

Alkaryl: any group derived from an alkyl group as defined above wherein a hydrogen atom is replaced by an aryl as defined above. The alkaryl preferably comprises from 5 to 20 carbon atoms, and more preferably from 5 to 12 carbon atoms;

Alkyloxy: a saturated, linear or branched, $C_1$-$C_{20}$, preferably $C_1$-$C_{12}$, more preferably $C_1$-$C_6$, and even more preferably $C_1$-$C_4$, hydrocarbon-based aliphatic group containing an oxygen atom. As the alkyl group, there may be mentioned, for example, methyloxy, ethyloxy, n-propyloxy, iso-propyloxy, n-butyloxy, sec-butyloxy, tert-butyloxy and isobutyloxy radicals;

Aryloxy: any aryl radical linked to an oxygen atom, preferably comprising from 4 to 20 carbon atoms, and more preferably from 4 to 12 carbon atoms. As the aryloxy group, it may be mentioned, for example, phenoxy radical;

Amino-alkyl: a saturated, linear or branched, $C_1$-$C_{20}$, preferably $C_1$-$C_{12}$, more preferably $C_1$-$C_6$, and even more preferably $C_1$-$C_4$, hydrocarbon-based aliphatic group bearing an amino group, and preferably a primary amino group —$NH_2$;

Amino-aryl: any aryl radical linked to an amino group, and preferably a primary amino group —$NH_2$, preferably comprising from 4 to 20 carbon atoms, and more preferably from 4 to 12 carbon atoms;

Thio-alkyl: a saturated, linear or branched, $C_1$-$C_{20}$, preferably $C_1$-$C_{12}$, more preferably $C_1$-$C_6$, and even more preferably $C_1$-$C_4$, hydrocarbon-based aliphatic group bearing a thiol group —SH;

Thio-aryl: any aryl radical linked to a thiol group —SH, preferably comprising from 4 to 20 carbon atoms, and more preferably from 4 to 12 carbon atoms;

Alkyl phosphonate: any alkyl radical linked to a phosphonic group —$P(=O)(OR')_2$ wherein $R'$ is a saturated, linear or branched, $C_1$-$C_{20}$, preferably $C_1$-$C_{12}$, more preferably $C_1$-$C_6$, and even more preferably $C_1$-$C_4$, hydrocarbon-based aliphatic group;

Aryl phosphonate: any aryl radical linked to a phosphonate group —$P(=O)(OR')_2$ wherein $R'$ is saturated, linear or branched, $C_1$-$C_{20}$, preferably $C_1$-$C_{12}$, more preferably $C_1$-$C_6$, and even more preferably $C_1$-$C_4$, hydrocarbon-based aliphatic group;

Cyclodienyl: any unsaturated cyclic radical containing at least two carbon-carbon double bonds, and preferably comprising from 5 to 20 carbon atoms, and more preferably from 5 to 12 carbon atoms.

The presence of anionic groups Y and Y' gives rise to lower the solubility of the solid p-type electroactive organic catalyst lithium salt in aprotic polar solvents.

In the general structure (1), the aromatic or heteroaromatic ring Ar is preferably benzene or naphthalene.

In the general structure (1), $R^1$ to $R^4$ are preferably each independently selected from the group consisting of hydrogen (H) and aryl groups, the latter comprising from 4 to 20 carbon atoms and being optionally substituted with at least one halogen, oxygen or sulphur atom. $R^1$ to $R^4$ are even more preferably each independently selected from H and phenyl (—$C_6H_5$).

In the general structure (1), $R^5$ and $R^6$ are preferably H, —$CH_3$ or —$C_2H_5$, and more preferably H.

In the general structure (1), Y and Y' are preferably carboxylate groups.

In a more preferred embodiment, the solid p-type electroactive organic catalyst lithium salt shows the following general structure (2):

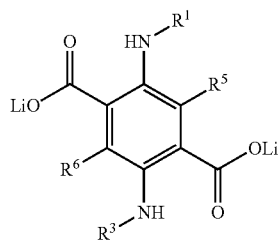

(2)

wherein:
$R^1$ and $R^3$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O=)CHNR, —HN(O=)CR, —(O=)COR, —HN(O=)CHNR, —HN(O=)COR, —(HN=)CHNR, —HN(HN=)CHNR, —(S=)CHNR, —HN(S=)CHNR, with R being H or a $C_1$-$C_{19}$-alkyl group, and preferably with R being H or a $C_1$-$C_6$-alkyl group, said $R^1$ and $R^3$ groups comprising from 1 to 20 carbon atoms and being optionally substituted with at least one halogen, oxygen or sulphur atom, $R^5$ and $R^6$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O=)CHNR, —HN(O=)CR, —(O=)COR, —HN(O=)CHNR, —HN(O=)COR, —(HN=)CHNR, —HN(HN=)CHNR, —(S=)CHNR, —HN(S=)CHNR, with R being H or a $C_1$-$C_{19}$-alkyl group, and preferably with R being H or a $C_1$-$C_6$-alkyl group, said $R^5$ and $R^6$ groups comprising from 1 to 20 carbon atoms and being optionally substituted with at least one halogen, oxygen or sulphur atom.

In the general structure (2), $R^1$ and $R^3$ are preferably each independently selected from the group consisting of H and aryl groups, the latter comprising from 4 to 20 carbon atoms and being optionally substituted with at least one halogen, oxygen or sulphur atom. $R^1$ and $R^3$ are even more preferably phenyl (—$C_6H_5$).

In the general structure (2), $R^5$ and $R^6$ are preferably H, —$CH_3$ or —$C_2H_5$, and more preferably H.

The presence of carboxylates in the solid p-type electroactive organic catalyst lithium salt of the invention further lowers the solubility of the SOC in aprotic polar solvents, typically used in the electrolyte of non-aqueous lithium-air batteries.

In a particularly preferred embodiment, the solid p-type electroactive organic catalyst lithium salt of the invention is Dilithium 2,5-(DiAnilino)Terephthalate ($Li_2DAnT$).

$Li_2DAnT$ is already known for its use as an organic Li-ion battery material, but not as a lithium-air battery material (Deunf et al., Journal of Materials Chemistry A, 2016, 4, 6131-6139). In this organic lithium-ion battery material, the electrolyte is based on carbonates, which is not recommended for lithium-air batteries as far as they decompose.

The solid p-type electroactive organic catalyst lithium salt of the invention advantageously shows less than 0.148 g·$L^{-1}$ solubility in lithium bis(trifluoromethanesulfonyl)imide (LiTFSI) 1M in tetraethylene glycol dimethyl ether (TEGDME).

The positive electrode of the lithium-air battery cell of the invention may further comprise a solid n-type electroactive organic catalyst lithium salt.

In a preferred embodiment, the solid n-type electroactive organic catalyst lithium salt shows the following general structure (3):

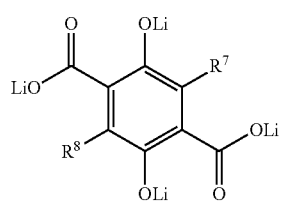

(3)

wherein $R^7$ and $R^8$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O═)CHNR, —HN(O═)CR, —(O═)COR, —HN(O═)CHNR, —HN(O═)COR, —(HN═)CHNR, —HN(HN═)CHNR, —(S═)CHNR, —HN(S═)CHNR, with R being H or a $C_1$-$C_{19}$-alkyl group, and preferably with R being H or a $C_1$-$C_6$-alkyl group, said $R^7$ and $R^8$ groups comprising from 1 to 20 carbon atoms and being optionally substituted with at least one halogen, oxygen or sulphur atom.

$R^7$ and $R^8$ are preferably each independently selected from the group consisting of H and aryl groups, the latter comprising from 4 to 20 carbon atoms and being optionally substituted with at least one halogen, oxygen or sulphur atom. $R^7$ and $R^8$ are more preferably H, —$CH_3$ or —$C_2H_5$, and more preferably H.

In a particularly preferred embodiment, the solid n-type electroactive organic catalyst lithium salt of the invention is dilithium (2,5-dilithium-oxy)-para-terephthalate ($Li_4$-p-DHT).

$Li_4$p-DHT is already known as a positive active material in Li-ion battery systems (Renault et al., Energy & Environmental Science, 2013, 6, 2124-2133). The electrolyte used in these systems is 1 M $LiPF_6$ in EC:DMC (1:1), the cell thus working under an inert atmosphere which does not contain oxygen as far as EC:DMC decomposes in presence of oxygen.

The weight ratio between solid p-type electroactive organic catalyst lithium salt and solid n-type electroactive organic catalyst lithium salt may range from 0.1/99.9 to 100/0, preferably from 60/40 to 40/60, and more preferably is of 50/50.

In the lithium-air battery cell of the present invention, the positive electrode may be a component in which the redox catalyst is supported on a carrier. An example of the carrier is carbon. Therefore, in the lithium-air battery cell of the invention, the positive electrode advantageously further comprises carbon. Examples of carbon include carbon blacks, such as Ketjen Black, acetylene black, channel black, furnace black, lamp black, and thermal black; graphite, such as natural graphite, e.g., scaly graphite, artificial graphite, and expanded graphite; activated carbon from charcoal and coal; carbon foam; carbon fibers obtained by carbonizing synthetic fibers and petroleum pitch-based materials; carbon nanofibers; molecular carbon such as fullerenes; and tubular carbon, such as carbon nanotubes. Modified carbons such as N-doped carbon may also be used.

Positive electrode materials can also be used in a lithium-air battery cell of the present invention based on materials other than carbon. For example, positive electrode materials based on metal foam, stable and conductive metal oxides, or steel, can be used.

In the present invention, where carbon is used, it is preferably a porous material in the form of a powder and preferably has a high specific surface area of 20 to 2000 $m^2 \cdot g^{-1}$, more preferably of 60 to 2000 $m^2 \cdot g^{-1}$, and even more preferably of 60 to 1500 $m^2 \cdot g^{-1}$. For example, carbon may be used upon which a treatment is performed by a general method to increase porosity or surface area, followed by another treatment to increase the wettability. Different forms of carbon can be used in the present invention including SUPER P® Li (from TIMCAL) showing a particle size of 40 nm and a specific surface area (determined by the Brunauer-Emmett-Teller method) of 62 $m^2 \cdot g^{-1}$; BLACK PEARLS® 2000 (from Cabot Corporation) showing a particle size of 12 nm and a specific surface area (determined by the Brunauer-Emmett-Teller method) of 1487 $m^2 \cdot g^{-1}$; Ketjenblack® EC-6003D powder (from AzkoNobel) showing a specific surface area (determined by the Brunauer-Emmett-Teller method) of 1400 $m^2 \cdot g^{-1}$. Examples of the commercial carbon products which can be used in the present invention include Carbon Super C65 (from Imerys), the KS series, SFG series, and Super S series (from TIMCAL), activated carbon products available from Norit and AB-Vulcan 72 (from Cabot). Other examples of commercially available carbon include the WAC powder series (from Xiamen All Carbon Corporation), PW15-type, J-type, and S-type Activated Carbons (from Kureha), and Maxsorb MSP-15 (from Kansai Netsu Kagaku).

Examples of the method for increasing the porosity, surface area and wettability of the carbon include physical activation or chemical activation. The chemical activation method includes, for example, immersing the carbon material in a strong alkaline aqueous solution (potassium hydroxide solution for example), in an acid solution (nitric acid or phosphoric acid for example) or in a salt (zinc chloride for example). This treatment can be followed (but not necessarily) by a calcination step at relatively low temperature (450 to 900° C. for example).

In addition, the carbon preferably has pores having a pore diameter of 5 nm or more, preferably of 20 nm or more. The specific surface area of the carbon and the pores size can be measured by the BET method or the BJH method, for example. Furthermore, in general, the carbon preferably has an average particle diameter (primary particle diameter) of 8 to 350 nm, more preferably of 30 to 50 nm. The average primary particle diameter of the carbon can be measured by TEM.

In the lithium-air battery cell of the invention, the weight ratio between carbon and (solid p-type electroactive organic catalyst lithium salt+solid n-type electroactive organic catalyst lithium salt+carbon) is advantageously greater than or equal to 77%.

In the lithium-air battery cell of the present invention, the positive electrode may contain a conductive material, in addition to the carbon and non-carbon materials discussed above. Examples of such further conductive materials include conductive fibers such as metal fibers; metal powders, such as silver, nickel, aluminium powders; and organic conductive materials such as polyphenylene derivatives. These may be used separately or in combination as a mixture.

In the lithium-air battery cell of the present invention, the positive electrode may contain a polymer binder. The polymer binder is not particularly limited. The polymer binder may be composed of a thermoplastic resin or a thermosetting resin. Examples thereof include polyethylene, polypropylene, polytetrafluoroethylene (PTFE), styrene-butadiene rubber, tetrafluoroethylene-hexafluoropropylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers. Copolymers having sulfonate group-terminated perfluorovinyl ether groups attached to a poly(tetrafluoroethylene) backbone, such as those commonly referred to as Naflon®, may also be envisaged as polymer binders in the present invention. These polymer binders may be used separately or in combination as a mixture. Polytetrafluoroethylene (PTFE) is a particularly preferred polymer binder.

In the lithium-air battery cell of the invention, the weight ratio between the polymer binder and (solid p-type electroactive organic catalyst lithium salt+solid n-type electroactive organic catalyst lithium salt+carbon+polymer binder) is lower than or equal to 20%.

In general, in advantageous embodiments of the present invention, an air cathode collector is connected to the air cathode, which collects current from the air cathode. The material for the air cathode collector and the shape of the same are not particularly limited. Examples of the material for the air cathode collector include stainless steel, aluminium, iron, nickel, titanium and carbon. Examples of the form of the air cathode collector include a foil form, a plate form, a mesh (grid) form and a fibrous form. Preferably, the air cathode collector has a porous structure such as a mesh form since the collector having a porous structure has excellent efficiency of oxygen supply to the air cathode.

In some embodiments, the air electrode (air cathode) further comprises hydrophobic hollow fibers. A hydrophobic fiber tends to generate a space between itself and the electrolyte. These spaces facilitate oxygen diffusion in the air electrode, enabling a thicker electrode to be used. Typically carbon-based air electrodes are 0.5 to 0.7 mm thick. Addition of hydrophobic fibers allows use of electrodes that are at least 1 mm thick. Suitable fibers include DuPont HOLLOFIL® (100% polyester fiber with one more holes in the core), goose down (very small, extremely light down found next to the skin of geese), PTFE fiber, and woven hollow fiber cloth, among others. KETJENBLACK® carbon can also be coated on these fibers.

<Electrolyte>

In the lithium-air battery cell of the present invention, the non-aqueous ion-conducting (electrolyte) medium arranged between the negative electrode and the positive electrode is a non-aqueous electrolytic solution containing one or more organic solvents and typically containing a salt. Non-limiting examples of the salt that can be used include known supporting electrolytes, such as $LiPF_6$, $LiClO_4$, $LiAsF_6$, $LiBF_4$, $Li(CF_3SO_2)_2N$ (LiTFSI), LiFSI, $Li(CF_3SO_3)$ (LiTriflate), $LiN(C_2F_5SO_2)_2$, LiBOB, LiFAP, LiDMSI, LiHPSI, LiBETI, LIDFOB, LiBFMB, LiBison, LiDCTA, LiTDI, LiPDI. These salts may be used separately or in combination. The concentration of the salt is preferably in the range of 0.1 to 2.0 M, and more preferably of 0.8 to 1.2 M.

The lithium salts are appropriately used in the electrolyte medium in combination with aprotic organic solvents known for use in lithium-air batteries. Examples of such aprotic organic solvents include chain carbonates, cyclic ester carbonates, chain ethers, cyclic ethers, glycol ethers, and nitrile solvents. Examples of chain carbonates include dimethyl carbonate, diethyl carbonate, and methyl ethyl carbonate. Examples of cyclic ester carbonates include γ-butyrolactone and γ-valerolactone. Examples of chain ethers include dimethoxyethane and ethylene glycol dimethyl ether. Examples of cyclic ethers include tetrahydrofuran and 2-methyltetrahydrofuran. Examples of glycol ethers include tetraethylene glycol dimethyl ether (TEGDME), diethylene glycol dimethyl ether (diglyme), triethylene glycol dimethyl ether (triglyme), poly(ethylene glycol) dimethyl ether with a weight average molecular weight Mw from 90 to 225 $g \cdot mol^{-1}$. Nitrile solvents can also be used, such as acetonitrile, propionitrile, and 3-methoxypropionitrile. These aprotic organic solvents may be used separately or in combination as a mixture. Glycol ethers are the preferred aprotic organic solvents, and in particular tetraethylene glycol dimethyl ether (TEGDME).

In the framework of the present invention, gel polymer electrolytes can also be used. The gelled electrolyte having lithium ion conductivity can be obtained by, for example, adding a polymer to the non-aqueous electrolytic solution for gelation. In particular, gelation can be caused by adding a polymer such as polyethylene oxide (PEO), polyvinylidene fluoride (PVDF, commercially available as Kynar, etc.), polyacrylonitrile (PAN), polymethyl methacrylate (PMMA), and poly(vinyl) chloride (PVC). A review of the use of gel-type polymer electrolytes for lithium-ion batteries is provided by Song et al., Journal of Power Sources, 77(1999), 183-197.

Components which can be cross-linked and/or thermoset may also be added to the gel electrolyte formulation to improve its mechanical properties.

Also, incorporation of substantial amount of plasticizers (PEG, crown ethers, etc.) may be carried out to improve the ionic conductivity of the polymer electrolytes.

In addition, nanoparticles/ceramics ($Al_2O_3$, $SiO_2$, $ZrO_2$, MgO, $CeO_2$, etc.) may be added to such gel polymer electrolytes to increase their conductivities. Reference in this regard may be made to EP 1 096 591 A1 or Croce et al., Electrochimica Acta 46 (2001), 2457-2461.

The nanoparticle/ceramic filler content is usually less than 10 wt % of the membrane. For example $Al_2O_3$ nanoparticles may be obtained from Aldrich Research Grade and have 5.8 nm particle size (Swierczynski et al., Chem. Mater., 2001, 13, 1560-1564). $SiO_2$ fumed silica may be obtained from Aldrich Reagents Grade, with a 7 nm particle size. In general, the nanoparticle size is preferentially around 15 nm or below.

It may further be contemplated in the framework of the present invention to add an oxygen dissolution enhancer to the electrolyte medium. This oxygen dissolution enhancer may be a fluorinated polymer, a fluorinated ether, a fluorinated ester, a fluorinated carbonate, a fluorinated carbon material, a fluorinated blood substitute, or indeed a metalloprotein. Such oxygen dissolution enhancers are described in US 2010/0266907.

<Separator>

In the rechargeable lithium-air battery cell of the present invention, a separator may advantageously be provided between the air cathode and the anode for complete electrical insulation between these electrodes. The separator is not particularly limited as long as it is able to electrically insulate the air cathode and the anode from each other and has a structure that allows the electrolyte to be present between the air cathode and the anode.

Examples of the separator include porous films and non-woven fabrics comprising polyethylene, polypropylene, cellulose, polyvinylidene fluoride, glass ceramics, etc. Of these, a separator of glass ceramics is preferred.

<Battery Cell Case>

As the battery cell case for housing the rechargeable lithium-air battery cell, general battery cases for rechargeable lithium battery cell can be used. The shape of the battery cell case is not particularly limited as long as it can hold the above-mentioned air cathode, anode and electrolyte. Specific examples of the shape of the battery cell case include a coin shape, a flat plate shape, a cylindrical shape and a laminate shape. It is possible for the battery of the present invention to be completely encased in an oxygenpermeable membrane, advantageously one which shows selectivity for oxygen diffusion over that of water.

<Use of the Battery Cell of the Invention>

The rechargeable lithium-air battery cell of the invention can discharge when an active material, which is oxygen, is supplied to the air cathode. Examples of oxygen supply source include the air and oxygen gas, and preferred is oxygen gas. The pressure of the supplied air or oxygen gas is not particularly limited and can be appropriately determined.

The lithium-air battery cell of the present invention may be used as a primary battery cell or a rechargeable secondary battery cell.

The lithium-air battery cell of the present invention may, for example, be put to practical use in a process wherein the battery is cycled between certain limits defined by initial and final voltage, or initial and final capacity or specific capacity. For example, one process for using the lithium-air battery cell of the present invention may consist of a process wherein:

(a) the lithium-air battery cell is provided in a fully charged state;

(b) the lithium-air battery cell is subjected to discharge until the specific capacity reaches a value X;

(c) the lithium-air battery cell is recharged;

(d) steps (b) and (c) are repeated.

The specific capacity value X selected may vary widely and, for example, be situated in the range of 200 to 10000 mAh·g$^{-1}$. The specific capacity of a lithium-air battery cell may be determined by discharging up until 2 V. It may be appropriate during operation of the battery cell to cycle the battery cell within limits that do not go to full discharge or charge. It may be advantageous to cycle the battery cell from 10 to 90% of its specific capacity (determined in step (b)), preferably from 20 to 80%, and more preferably from 20 to 70%. Cycling may also be carried out between certain limits of Initial or maximum theoretical discharge capacity. Capacity-limited cycling may enable the cell to survive longer, and it may thus be appropriate to limit the cycling capacity to around 30% of the full discharge capacity.

It is possible to provide as a product a battery cell whose air cathode contains added $Li_2O_2$. Such a battery cell would typically be charged before use.

The lithium-air battery cell of the present invention can be used as a rechargeable lithium battery for electric vehicles and hybrid vehicles, electronic devices (such as computers and telephones), and stationary power generating devices, and can be assembled in battery packs. The number of battery cells may vary depending on the final use of the lithium-air battery, and preferably may vary from 2 to 250 battery cells. There are two possible ways to assemble battery cells depending on the final target: in parallel or in series. In parallel, the capacity of each cell is added while keeping the same voltage. In series, the voltage of each cell is added while the capacity is the one of the smallest cell.

Any combination of the above described elements in all possible variations thereof is encompassed by the invention unless otherwise indicated herein or otherwise clearly contradicted by context. Thus, all features and embodiments described herein in particular as applicable, advantageous or preferred in the context of the invention are to be construed as being applicable in combination with one another, in preferred embodiments of the invention.

EXAMPLES

Preparation of a SOC According to the Invention: $Li_2DAnT$

The lithiation of 2,5-(dianilino) terephthalic acid ($H_2DAnT$) also named 2,5-bis(phenylamino)terephthalic acid (1.0 g, 2.9 mmol) was performed in anhydrous tetrahydrofuran (30 mL) with a stoichiometric amount of lithium hydride (45.6 mg, 5.8 mmol). The solution was stirred at room temperature under an inert atmosphere over 20 h. After filtration of the precipitate, thorough washing with diethyl ether and drying at 60° C. under vacuum overnight, the final $Li_2DAnT_{1.95}THF$ compound was obtained (1.2 g, 86%). $Li_2DAnT_{1.95}THF$: pale yellow powder; IR: ν max (KBr)/cm$^{-1}$ 3360, 2980-2880 (THF), 1600, 1570, 1530, 1500, 1440, 1420, 1370, 1285, 1050 (THF) cm$^{-1}$; $^1$H NMR: $δ_H$ (400 MHz, $(CD_3)_2SO$) 11.22 (2H, s, H labile), 7.92 (2H, s), 7.20-7.16 (4H, t, J=6.8 Hz, H-meta), 7.06-7.03 (4H, d, J=8.0 Hz, H-ortho), 6.74-6.70 (2H, t, J=6.8 Hz, H-para), 3.62-3.59 (t, H-THF), 1.78-1.75 (t, H-THF); $^{13}$C NMR: $δ_C$: (400 MHz, $(CD_3)_2SO$) 170.4 (C, C=O), 144.7 (C, C—NH), 135.4 (C, C—NHPh), 128.9 (CH, C-meta), 127.0 (C, C—COOLi), 118.8 (CH), 118.1 (CH, C-para), 116.1 (CH, C-ortho), 67.0 ($CH_2$, THF), 25.1 ($CH_2$, THF); ESI-HRMS m/z 353.1104 [M-Li]$^-$ (calc. for $C_{20}H_{14}LiN_2O_4$, 353.1114); elemental analysis; found: C, 64.86%; H, 5.83%; N, 5.18% (calc. for $C_{20}H_{14}Li_2N_2O_4$·1.95THF·0.75$H_2O$: C, 64.92%; H, 6.09%; N, 5.45%), since, due to the high hygroscopicity of the compound, water traces could not be avoided; ICP-OES for Li quantification; found: Li, 2.73% (calc. for $C_{20}H_{14}Li.N_2O_4$·1.95THF: Li, 2.77%). For the desolvation of $Li_2DAnT_{1.95}THF$, small amounts (100 mg scale) of previously ground powder were heated in a Büchi glass oven (B-585 Kugelrohr) at a real internal temperature of 250° C. over 18 h. The final $Li_2DAnT$ compound was obtained (100 mg scale, quantitative yield). The efficacy of the desolvation process was checked by thermal analysis, and the absence of THF traces was confirmed by NMR and IR spectra.

$Li_2DAnT$: bright yellow powder; IR: ν max (KBr)/cm$^{-1}$ 3370, 1600, 1570, 1530, 1500, 1440, 1420, 1280 cm$^{-1}$; $^1$H NMR: $δ_H$ (400 MHz, $(CD_3)_2SO$) 11.26 (2H, s), 7.98 (2H, s), 7.25-7.22 (4H, t, J=8.0 Hz, H-meta), 7.12-7.10 (4H, d, J=8.0 Hz, H-ortho), 6.79-6.76 (2H, t, 3=7.2 Hz, H-para); $^{13}$C NMR: $δ_C$: (100 MHz, $(CD_3)_2SO$) 170.4 (C, C=O), 144.7 (C, C—NH), 135.5 (C, C—NHPh), 128.9 (CH, C-meta), 127.0 (C, C—COOLi), 118.8 (CH), 118.1 (CH, C-para) 116.1 (CH, C-ortho); ESI-HRMS m/z 353.1104 [M-Li]$^+$ (calc. for $C_{20}H_{14}LiN_2O_4$, 353.1114); ICP-OES for Li quantification; found: Li, 4.02% (calc. for $C_{20}H_{14}LiN_2O_4$: Li, 3.85%).

The characteristics of the obtained $Li_2DAnT$ were as follows:
  Specific surface area: 316 m$^2$·g$^{-1}$,
  Density: 1.375 g·cm$^{-3}$, and
  Morphology: Platelets.

Preparation of a SOC According to the Invention: $Li_4$-p-DHT

The lithiation of the commercially available 2,5-dihydroxyterephthalic acid ($H_4$-p-DHT) (Aldrich, 198.1 mg, 1 mmol) was performed in anhydrous methanol (15 mL Aldrich) with a stoichiometric amount of lithium methoxide (MeOLi) (Aldrich, 2.2 M solution in methanol, 1.82 mL, 4 mmol). A yellow precipitate was formed rapidly. After 14 h of reaction, the methanol was eliminated (by filtration of the precipitate or evaporation in a Büchi glass oven B-585 Kugelrohr under vacuum at room temperature) and the yellow solid was dried in a Büchi glass oven B-585 Kugelrohr under vacuum at 100° C. overnight, and then at 200° C. for 12 h.

Yield=98%. IR: ν max (KBr)/cm$^{-1}$ 1582 (C=O), 1472-1432 (C=C), 1372 (OC—O), 1237 (C—O), 1115, 887, 823 cm$^{-1}$; 1; H NMR: δ$_H$ (300 MHz, (CD$_3$)$_2$SO)+H$_2$SO$_4$ 11.20 (s, H acid), 7.21 ppm (s, 2H, H arom.); $^{13}$C NMR: δ$_C$: (75 MHz, (CD$_3$)$_2$SO) 170.74 (COOH), 152.42 (C—OH), 119.88 (C—COOH), 117.87 ppm (CH).

The specific surface area of the obtained Li$_4$p-DHT was of 35 m$^2$·g$^{-1}$.

Preparation of the Electrolytes:

Three electrolyte solutions were prepared by dissolving:
a) 1.0 M bis(trifluoromethane)sulfonimide lithium salt (LiTFSI, BASF) in TEGDME (Sigma Aldrich, moisture controlled grade),
b) 1.0 M LITFSI and 10$^{-2}$ M (10 mM) DBBQ (Sigma Aldrich) in TEGDME,
c) 1.0 M LITFSI and 10$^{-2}$ M (10 mM) TTF (Sigma Aldrich) in TEGDME.

LiTFSI, DBBQ and TTF were dried at 100° C. overnight under vacuum while TEGDME solvent was used after drying/storage on regenerated 3 Å molecular sieves (Sigma Aldrich) for at least 15 days in a glovebox. The water content in the solvent and in the electrolytes was determined by means 831KF Karl Fischer coulometer (Metrohm) technique and was measured to be lower than 4 ppm.

Preparation of LiFePO$_4$ (LFP) Anode:
wt % composition: LFP/carbon black/binder (PVdF): 88/4.5/7.5
Expected loading: 1.3 mAh·cm$^{-2}$
Expected loading: 9.89 mg$_{lot}$·cm$^{-2}$
Coating thickness (without aluminium foil): 47 μm
Aluminium foil thickness: 15 μm (ρ$_{Al}$=2.7 g·cm$^{-3}$)
Coating porosity: 35%
Expected Characteristics:
Q$_{reversible}$ (@ C/5, potential window: 2.1-4.3 V)~152 mAh·g$_{LFP}^{-1}$ The LFP electrodes used for the following tests are punched 11 mm diameter discs (area: 0.9503 cm$^2$).

Partially oxidized LFP electrodes were used as a counter electrode for all tests for standardization purposes.

Also for standardization purposes, all data were plotted with voltage expressed in Volt vs Li$^+$/Li by applying a correction of 3.4 Volt.

Assembly of the Battery:

In order to compare the SOC of the invention to soluble catalysts (DBBQ and TTF) in the same experimental conditions, the tests were done in a configuration partially oxidized LFP/electrolyte/O$_2$ electrodes with a LFP anode.

Modified Swagelok cells with an opening to atmosphere were assembled using as anode a disc of pure lithium metal (diameter=11 mm and thickness=0.7 mm) or a disc of LFP (provided by IMN) (diameter=11 mm, thickness=0.045 mm, and 9.4 mg in weight of active material). Two pieces of glass fibre separators (Whatman, diameter=13 mm) impregnated with 210 μL electrolyte were used as separators. The above prepared carbon-based electrodes were used as working electrodes. Before transferring the assembled Swagelok cells out of the glovebox, they were placed inside a special designed airtight container with inlet and outlet valves. Some Swagelok cells in the containers were kept under argon while the other containers were filled with a continuous relatively high flow of dry oxygen (5.0 purity, spilled from a high-pressure cylinder through a stainless steel gas lines) for 30 minutes. Similarly to the cathodes, LFP and separators were dried at 120° C. overnight under vacuum and all the cell components (modified Swagelok and designed airtight containers) were dried in an oven at 70° C. for 12 h before usage.

Comparative Example 1: Air Electrode Containing Only Carbon (Reference)

Carbon Super C65 (Imerys) and polytetrafluoroethylene (PTFE, 60 wt % dispersion in H$_2$O, Sigma Aldrich) were mixed with a weight ratio of 4:1 w/w (carbon:PTFE) in a agate mortar for 20 minutes. The resulting black paste was wetted with 2-propanol (VWR International, 1.4 mL$_{2\text{-}propanol}$/g$_{paste}$) in order to improve the mixing and malleability. Once a rubber-like composite was obtained, approximately 160 mg were placed on a 4×4 cm$^2$ area stainless steel mesh. The rubber-like composite was then pressed using a Teflon™ cylinder until the mesh was evenly covered by the black paste. The mesh was then placed between two aluminum foils and, by means a hydraulic press, a pressure of 35 MPa was applied for 30 seconds three times. Afterwards, it was dried in a ventilating oven for 1 h at 100° C. and then cut into discs of diameter 4 mm. Before using the above prepared electrodes, they were dried at 150° C. overnight under vacuum. The final weight of electrodes was 0.8±0.1 mg after mesh weight subtraction and with a thickness of 0.32±0.04 mm.

This air electrode containing only carbon and PTFE was assembled in a battery with an electrolyte free of any soluble catalyst (electrolyte a)).

Comparative Example 2: Air Electrode Containing Carbon+10 mM DBBQ Added in the Electrolyte An air electrode containing carbon and PTFE was prepared according to the same protocol as in Comparative Example 1 and assembled in a battery with electrolyte containing 10 mM DBBQ (electrolyte b)).

Comparative Example 3: Air Electrode Containing Carbon+10 mM TTF Added in the Electrolyte The air electrode containing carbon and PTFE was prepared according to the same protocol as in Comparative Example 1 and assembled in battery with electrolyte containing 10 mM TTF (electrolyte c)).

Example 1: Air Electrode Containing Carbon+Li$_2$DAnT (7:2 Weight Ratio) in Electrolyte a)

Carbon Super C65 and PTFE (dry powder, Oxford University) were first dried overnight at 120° C. under vacuum while Li$_2$DAnT was used as received from University of Nantes without further drying or purifications.

Carbon Super C65 and Li$_2$DAnT were mixed in a mortar for 20 minutes in 7:2 (carbon:Li$_2$DAnT) weight ratio. After that, PTFE were blended with the pastes in a weight ratio (carbon+Li$_2$DAnT):PTFE of 4:1 and approximately 2 mL of 2-propanol was added. All the components were mixed for additional 20 minutes in an agate mortar until the two obtained rubber-like composites appeared homogeneously black (weight ratio carbon:Li$_2$DAnT=7:2) (total weight ratio: Carbon Super C65:Li$_2$DAnT:PTFE=28:8:9). Then, a small amount of the resulting composites was spread on pre-punched discs of stainless steel mesh of diameter=4 mm. The discs were then placed between two aluminum foils and, finally, a pressure of 35 MPa was applied for 30 seconds three times. The above prepared electrodes were dried again at 120° C. overnight under vacuum to remove any trace of 2-propanol. The final weight was 1.2±0.2 mg after mesh weight subtraction.

Example 2: Air Electrode Containing Carbon+Li$_2$DAnT (2:7 Weight Ratio) in Electrolyte a)

The procedure was the same as for Example 1, except that the weight ratio carbon:Li$_2$DAnT was 2:7 (total weight ratio: Carbon Super C65:Li$_2$DAnT:PTFE=8:28:9).

Example 3: Air Electrode Containing Carbon+ Li$_2$DAnT+Li$_4$-p-DHT (50:50) (Carbon:(Li$_2$DAnT+ Li$_4$-p-DHT) 7:2 Weight Ratio) in Electrolyte a)

Carbon Super C65 and PTFE (dry powder, Oxford University) were dried overnight at 120° C. under vacuum while Li$_2$DAnT and yellow L$_4$-p-DHT were used as received from University of Nantes without further drying or purifications. Li$_2$DAnT and Li$_4$-p-DHT were mixed in a mortar for 20 minutes in a 1:1 weight ratio. Then, Carbon Super C65 and the mixture Li$_2$DAnT/Li$_4$-p-DHT were mixed in a mortar for 20 minutes in 7:2 weight ratio (total weight ratio Carbon Super C65:Li$_2$DAnT:Li$_4$-p-DHT=7:1:1). Then, PTFE were blended with the pastes in a weight ratio of 4:1 ((carbon+ Li$_2$DAnT+Li$_4$-p-DHT):PTFE) and approximately 2 mL of 2-propanol have been added. All the components were mixed for additional 20 minutes in an agate mortar until the two obtained rubber-like composites appeared homogeneously black. The weight ratio of the final mixture Carbon Super C65:Li$_2$DAnT:Li$_4$-p-DHT:PTFE is 28:4:4:9. Then, a small amount of the resulting composites was spread on pre-punched discs of stainless steel mesh of diameter=4 mm. The discs were placed between two aluminium foils and, finally, a pressure of 35 MPa was applied for 30 seconds three times. The above prepared electrodes were dried again at 120° C. overnight under vacuum to remove any trace of 2-propanol. The final weight was 1.2±0.2 mg after mesh weight subtraction.

FIG. 1 shows that electrodes containing Li$_2$DAnT as SOC alone or Li$_2$DAnT combined with Li$_4$-p-DHT increase the discharge capacity (mAh·cm$^{-2}$) and to recharge the lithium-air with 100% efficiency, which is not the case for CE1, CE2 and CE3.

FIG. 2 shows the cycling of the lithium-air battery cell (FIG. 2a) and the capacity retention versus cycle number of the lithium-air battery cell (FIG. 2b) of Example 1 (Li$_2$DAnT:Carbon Super C65 (2:7) at 0.2 mAh·cm$^{-2}$ rate, within the potential window 2.2-4.6 V versus Li/Li$^+$ and with a capacity limitation of 800 mAh·g$^{-1}$soc (~2.15 mAh·cm$^{-2}$). With a capacity limitation of 2.15 mAh·cm$^{-2}$, the cyclability of the lithium-air battery cell of Example 1 is very high during the first 20 cycles.

FIG. 3 shows the cycling of the lithium-air battery cell (FIG. 3a) of Example 1 (Li$_2$DAnT:Carbon Super C65 (2:7) at 0.2 mAh·cm$^{-2}$ rate, within the potential window 2.2-4.6 V versus Li/Li$^+$ and with a capacity limitation of 2000 mAh·g$^{-1}$soc (~6 mAh·cm$^{-2}$), and of Comparative Example 1 (FIG. 3b). With a capacity limitation of 6 mAh·cm$^{-2}$, the cyclability of the lithium-air battery cell of Example 1 is very high during the first 5 cycles with respect to the lithium-air battery cell of Comparative Example 1.

Figure 4:
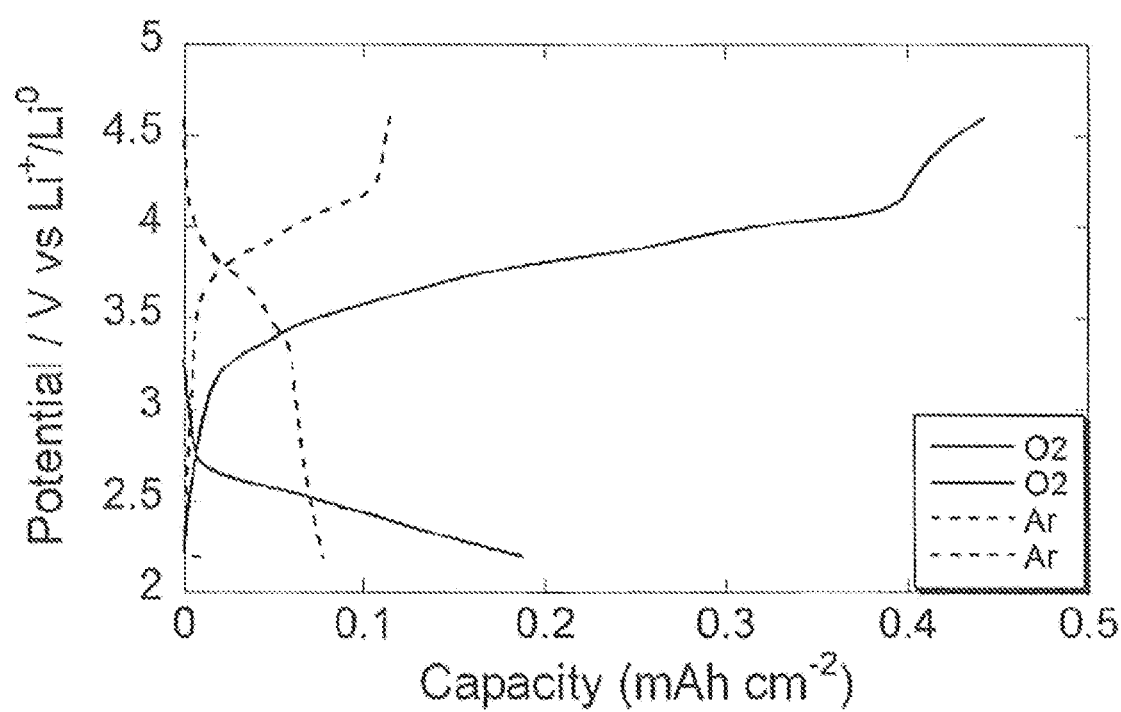
FIG. 4 shows a comparison of the $1^{st}$ cycle of the lithium-air battery cell of Example 1 using a working electrode containing $Li_2DAnT$ as SOC obtained in argon (plain line) or in oxygen (dotted line) for electrodes containing a ratio of $Li_2DAnT$:Carbon Super C65 of 2:7 (galvanostatic discharge performed at 0.5 mAh·$cm^{-2}$).

FIG. 4 shows a comparison of the 1$^{st}$ cycle of the lithium-air battery cell of Example 1 using a working electrode containing SOC Li$_2$DAnT obtained in argon (plain line) or in oxygen (dotted line) for electrodes containing a ratio of Carbon Super C65:Li$_2$DAnT of 7:2 (galvanostatic discharge performed at 0.5 mAh·cm$^{-2}$). FIG. 4 demonstrates that the SOC alone does not have a high capacity, while under oxygen an effect on the capacity is clearly seen.

Comparison with Prior Art Catalysts:

The following table (Table 1) summarizes properties of SOC used in lithium-air battery cells described in the present invention as compared to the ones disclosed in the following prior art references discussed above:

Prior art 1: Renault et al., Energy & Environmental Science, 2013, 6, 2124-2133,
Prior art 2: Gao et al., Nature Materials, 2016, 15, 882,
Prior art 3: Chen et al., Nature Chemistry, 2013, 5, 489,
Prior art 4: Gao et al., Nature Energy, Vol. 2, 17118 (2017),
Prior art 5: Hase et al., Chem. Commun. 2016, 52, 12151-12154,
Prior art 6: Bergner et al., Phys. Chem. Chem. Phys., 2015, 17, 31769-31779, and
Prior art 7: Kundu et al., ACS Cent., Sci., 2015, 1, 510-515.

TABLE 1

| | Organic catalyst | Formula | Electrolyte | Rate max (mAh·cm$^2$) | Activity | p/n type |
|---|---|---|---|---|---|---|
| SOC of the present invention | Li$_2$DAnT | [structure] | 1M LiTFSI in TEGDME | 0.2 | OER | p type |

TABLE 1-continued

| Organic catalyst | | Formula | Electrolyte | Rate max (mAh · cm$^2$) | Activity | p/n type |
| --- | --- | --- | --- | --- | --- | --- |
| SOC of the present invention | Li$_2$DAnT + Li$_4$-p-DHT | 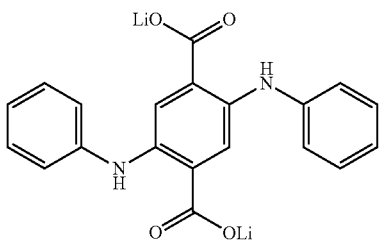 | 1M LiTFSI in TEGDME | 0.2 | OER + ORR | p type + n type |
| Prior art 1 | Li$_4$-p-DHT | 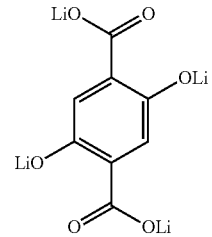 | 1M LiPF$_6$ in EC:PC | NA | ORR | n type |
| Prior art 2 | DBBQ | 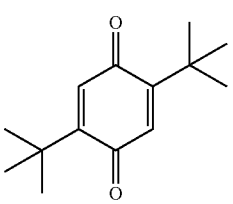 [SMILES: CC(C)(C)C1=CC(=O)C(C(C)(C)C)=CC1=O] | 1M LiTFSI in DME or TEDME | NA | ORR | n type |
| Prior art 3 | TTF | 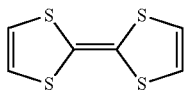 | 1M LiClO$_4$ in DMSO | NA | OER | p type |
| Prior art 4 | DBBQ + TEMPO | 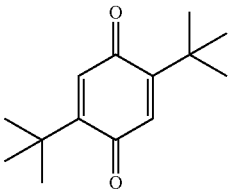 [SMILES: CC(C)(C)C1=CC(=O)C(C(C)(C)C)=CC1=O] | 0.3M LiClO$_4$ in DME | NA | ORR + OER | p + n type |

TABLE 1-continued

| | Organic catalyst | Formula | Electrolyte | Rate max (mAh · cm²) | Activity | p/n type |
|---|---|---|---|---|---|---|
| Prior art 5 | MeO-TEMPO | | — | — | OER | p type |
| Prior art 6 | 1-Me-AZADO | | 1M LiTFSI in diglyme | 0.1 | OER | P type |
| Prior art 7 | TDPA | | 0.5M LiTSFI in TEGDME | 0.1 | OER | P type |

NA = not applicable

The invention claimed is:

1. A lithium-air battery cell comprising:
a negative electrode containing a negative-electrode active material;
a positive electrode using oxygen as a positive-electrode active material; and
a non-aqueous electrolyte medium arranged between the negative electrode and the positive electrode;
wherein the positive electrode comprises a solid p-type electroactive organic catalyst lithium salt showing the following general structure (1):

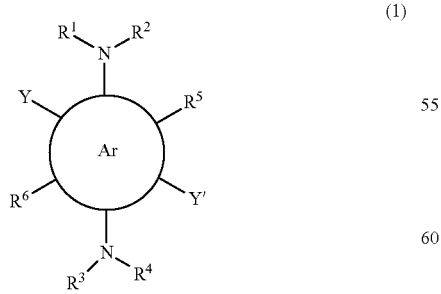

(1)

wherein:
Ar is an aromatic or heteroaromatic ring selected from the group consisting of: benzene, naphthalene, perylene, anthracene, phenanthrene, tetracene, chrysene, triphenylene, pyrene, pentacene, benzo[a]pyrene, corannulene, benzo[ghi]perylene, coronene, ovalene, benzo[c]fluorine, pyridine, quinolone, isoquinoline, pyrazine, quinoxaline, acridine, pyrimidine, quinazoline, pyridazine, cinnoline, phthalazine, 1,2,3-triazine, 1,2,4-triazine, 1,3,5-triazine, $R^1$ to $R^4$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O=)CHNR, —HN(O=)CR, —(O=)COR, —HN(O=)CHNR, —HN(O=)COR, —(HN=)CHNR, —HN(HN=)CHNR, —(S=)CHNR, —HN(S=)CHNR, with R being H or a $C_1$-$C_{19}$-alkyl group, the $R^1$ to $R^4$ groups comprising from 1 to 20 carbon atoms and being optionally substituted with at least one halogen, oxygen or sulphur atom, the latter comprising from 4 to 20 carbon atoms and being optionally substituted with at least one halogen, oxygen or sulphur atom, $R^5$ and $R^6$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O=)CHNR, —HN(O=)CR, —(O=)COR, —HN(O=)CHNR, —HN(O=)COR, —(HN=)CHNR, —HN(HN=)CHNR, —(S=)CHNR, —HN(S=)CHNR, with R being H or a $C_1$-$C_{19}$-alkyl group, the $R^5$ and $R^6$ groups comprising from 1 to 20 carbon atoms and being optionally substituted with at least one halogen, oxygen or sulphur atom, Y and Y' are anionic groups, each independently selected from the group consisting of carboxylate, thiocarboxylate, sulfonate, thiosulfonate, phosphonate, thiophosphonate, sulfate, amidate groups.

2. The lithium-air battery cell according to claim 1, wherein the solid p-type electroactive organic catalyst lithium salt shows less than 0.148 g·L$^{-1}$ solubility in lithium bis(trifluoromethanesulfonyl)imide (LiTFSI) 1M in tetraethylene glycol dimethyl ether (TEGDME).

3. A lithium-air battery cell comprising:
a negative electrode containing a negative-electrode active material;
a positive electrode using oxygen as a positive-electrode active material; and
a non-aqueous electrolyte medium arranged between the negative electrode and the positive electrode;
wherein the positive electrode comprises a solid p-type electroactive organic catalyst lithium salt,
wherein the solid p-type electroactive organic catalyst lithium salt shows the following general structure (2):

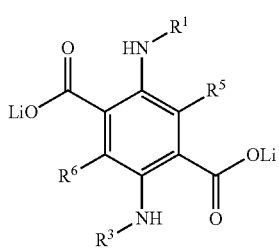

(2)

wherein:
R$^1$ and R$^3$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O═)CHNR, —HN(O═)CR, —(O═)COR, —HN(O═)CHNR, —HN(O═)COR, —(HN═)CHNR, —HN(HN═)CHNR, —(S═)CHNR, —HN(S═)CHNR, with R being H or a C$_1$-C$_{19}$-alkyl group, the R$^1$ and R$^3$ groups comprising from 1 to 20 carbon atoms and being optionally substituted with at least one halogen, oxygen or sulphur atom, the latter comprising from 4 to 20 carbon atoms and being optionally substituted with at least one halogen, oxygen or sulphur atom,
R$^5$ and R$^6$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O═)CHNR, —HN(O═)CR, —(O═)COR, —HN(O═)CHNR, —HN(O═)COR, —(HN═)CHNR, —HN(HN═)CHNR, —(S═)CHNR, —HN(S═)CHNR, with R being H or a C$_1$-C$_{19}$-alkyl group, the R$^5$ and R$^6$ groups comprising from 1 to 20 carbon atoms and being optionally substituted with at least one halogen, oxygen or sulphur atom.

4. The lithium-air battery cell according to claim 3, wherein R$^1$ and R$^3$ are phenyl (—C$_6$H$_5$).

5. The lithium-air battery cell according to claim 1, wherein the positive electrode further comprises a solid n-type electroactive organic catalyst lithium salt.

6. The lithium-air battery cell according to claim 5, wherein the solid n-type electroactive organic catalyst lithium salt shows the following general structure (3):

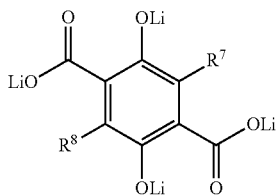

(3)

wherein R$^7$ and R$^8$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O═)CHNR, —HN(O═)CR, —(O═)COR, —HN(O═)CHNR, —HN(O═)COR, —(HN═)CHNR, —HN(HN═)CHNR, —(S═)CHNR, —HN(S═)CHNR, with R being H or a C$_1$-C$_{19}$-alkyl group, the R$^7$ and R$^8$ groups comprising from 1 to 20 carbon atoms and being optionally substituted with at least one halogen, oxygen or sulphur atom, the latter comprising from 4 to 20 carbon atoms and being optionally substituted with at least one halogen, oxygen or sulphur atom.

7. The lithium-air battery cell according to claim 6, wherein R$^7$ and R$^8$ are H.

8. The lithium-air battery cell according to claim 5, wherein the weight ratio between solid p-type electroactive organic catalyst lithium salt and solid n-type electroactive organic catalyst lithium salt ranges from 0.1/99.9 to 100/0.

9. The lithium-air battery cell according to claim 1, wherein the positive electrode further comprises carbon.

10. The lithium-air battery cell according to claim 9, wherein the weight ratio between carbon and (solid p-type electroactive organic catalyst lithium salt+solid n-type electroactive organic catalyst lithium salt+carbon) is greater than or equal to 77%.

11. The lithium-air battery cell according to claim 1, wherein the positive electrode further comprises a polymer binder selected from the group consisting of: polyethylene, polypropylene, polytetrafluoroethylene (PTFE), styrene-butadiene rubber, tetrafluoroethylene-hexafluoropropylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, and copolymers having sulfonate group-terminated perfluorovinyl ether groups attached to a poly(tetrafluoroethylene) backbone.

12. The lithium-air battery cell according to claim 11, wherein the weight ratio between the polymer binder and (solid p-type electroactive organic catalyst lithium salt+solid n-type electroactive organic catalyst lithium salt+carbon+polymer binder) is lower than or equal to 20%.

13. The lithium-air battery cell according to claim 1, wherein the non-aqueous electrolyte medium comprises one or more aprotic organic solvents selected from the group consisting of: chain carbonates, cyclic ester carbonates, chain ethers, cyclic ethers, glycol ethers, and nitrile solvents.

14. A battery pack comprising at least two assembled lithium-air battery cells according to claim 1.

15. A method comprising applying the battery pack according to claim 14 to act as a rechargeable battery for electric vehicles and hybrid vehicles, electronic devices, and stationary power generating devices.

16. A vehicle, an electronic device, and a stationary power generating device, comprising a battery pack according to claim 14.

17. The lithium-air battery cell according to claim 3, wherein the positive electrode further comprises a solid n-type electroactive organic catalyst lithium salt.

18. The lithium-air battery cell according to claim 17, wherein the solid n-type electroactive organic catalyst lithium salt shows the following general structure (3):

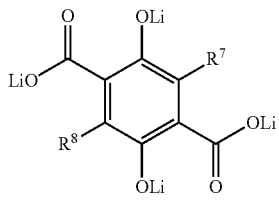

(3)

wherein $R^7$ and $R^8$ are each independently selected from the group consisting of: H, aryl, alkyl, alkenyl, alkaryl, alkyloxy, aryloxy, amino-alkyl, amino-aryl, thio-alkyl, thio-aryl, alkyl phosphonate, aryl phosphonate, cyclodienyl, —OCR, —(O=)CHNR, —HN(O=)CR, —(O=)COR, —HN(O=)CHNR, —HN(O=)COR, —(HN=)CHNR, —HN(HN=)CHNR, —(S=)CHNR, —HN(S=)CHNR, with R being H or a $C_1$-$C_{19}$-alkyl group, the $R^7$ and $R^8$ groups comprising from 1 to 20 carbon atoms and being optionally substituted with at least one halogen, oxygen or sulphur atom, the latter comprising from 4 to 20 carbon atoms and being optionally substituted with at least one halogen, oxygen or sulphur atom.

19. The lithium-air battery cell according to claim 18, wherein $R^7$ and $R^8$ are H.

20. The lithium-air battery cell according to claim 17, wherein the weight ratio between solid p-type electroactive organic catalyst lithium salt and solid n-type electroactive organic catalyst lithium salt ranges from 0.1/99.9 to 100/0.

* * * * *